United States Patent
Wang et al.

(10) Patent No.: US 10,691,920 B2
(45) Date of Patent: *Jun. 23, 2020

(54) INFORMATION IMAGE DISPLAY METHOD AND APPARATUS

(71) Applicant: Alibaba Group Holding Limited, George Town (KY)

(72) Inventors: Jing Wang, Hangzhou (CN); Wenxia Tong, Hangzhou (CN); Jie Zeng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,836

(22) Filed: Dec. 18, 2019

(65) Prior Publication Data

US 2020/0125825 A1     Apr. 23, 2020

Related U.S. Application Data

(63) Continuation of application No. 16/028,174, filed on Jul. 5, 2018, which is a continuation of application No. PCT/CN2016/113443, filed on Dec. 30, 2016.

(30) Foreign Application Priority Data

Jan. 6, 2016    (CN) .......................... 2016 1 0009271

(51) Int. Cl.
    *G06K 9/00*         (2006.01)
    *G06F 21/32*      (2013.01)
    (Continued)

(52) U.S. Cl.
    CPC ....... *G06K 9/00087* (2013.01); *G06F 9/4418* (2013.01); *G06F 21/32* (2013.01); *G06Q 20/3274* (2013.01)

(58) Field of Classification Search
None
See application file for complete search history.

(56) References Cited

U.S. PATENT DOCUMENTS 6,070,796 A *   6/2000   Sirbu .................. G06F 3/03543
                                                                                                                                                 235/382
6,721,891 B1 *   4/2004   Borza ..................... G06F 21/10
                                                                                                                                                726/20

(Continued)

FOREIGN PATENT DOCUMENTS

CN            101833651         9/2010
CN            101833651 A *    9/2010          G06K 9/00006

(Continued)

OTHER PUBLICATIONS

After the firmware is refereshed—default, Meizu, Aug. 9, 2019, pp. 1-6 (Year: 2019).*

(Continued)

*Primary Examiner* — Jayesh A Patel
(74) *Attorney, Agent, or Firm* — Fish & Richardson P.C.

(57) ABSTRACT

Techniques for providing an information image display method are described. One example method includes biometric information is received from a user at a client device. The received biometric information is determined whether it matches a predetermined biometric information from a plurality of stored predetermined biometric information. In response to determining the received biometric information matches one of the stored predetermined biometric information, data indicating an interface of an application is retrieved that corresponds to the stored predetermined biometric information. The data indicating the interface of the application on a display screen of the client device for a predetermined duration is displayed while the client device is in an unused mode. After the predetermined duration has (Continued)

elapsed, the data indicating the interface of the application from the display screen is removed while the client device remains in the unused mode.

13 Claims, 8 Drawing Sheets

(51) Int. Cl.
  *G06F 9/4401* (2018.01)
  *G06Q 20/32* (2012.01)

(56) References Cited

U.S. PATENT DOCUMENTS

| | | | | |
|---|---|---|---|---|
| 7,486,810 B1* | 2/2009 | Accapadi | G06F 21/32 | 382/124 |
| 7,715,593 B1* | 5/2010 | Adams | G06Q 20/341 | 382/115 |
| 8,311,514 B2* | 11/2012 | Bandyopadhyay | G06F 1/1643 | 455/410 |
| 8,667,297 B2* | 3/2014 | Salter | H03M 11/02 | 713/186 |
| 8,959,360 B1* | 2/2015 | Barra | G06F 21/629 | 713/186 |
| 9,098,735 B2* | 8/2015 | Cho | H03K 17/296 | |
| 9,165,129 B2* | 10/2015 | Smith | G06F 21/32 | |
| 9,224,029 B2* | 12/2015 | Setlak | G06K 9/00013 | |
| 9,384,369 B2* | 7/2016 | Dong | G06F 21/82 | |
| 9,430,084 B2* | 8/2016 | Kim | G06F 3/0412 | |
| 9,471,764 B2* | 10/2016 | Coons | G06F 21/32 | |
| 9,632,578 B2* | 4/2017 | Bae | G06F 21/32 | |
| 9,633,373 B2* | 4/2017 | Jung | G06Q 30/0261 | |
| 9,710,630 B2* | 7/2017 | Kim | G06F 21/32 | |
| 9,779,419 B2* | 10/2017 | Jung | G06Q 30/0269 | |
| 9,836,637 B2* | 12/2017 | Merrell | G06K 9/00033 | |
| 9,881,618 B2* | 1/2018 | Choi | H04M 1/72569 | |
| 9,916,078 B2* | 3/2018 | Kim | H04M 1/236 | |
| 9,954,858 B2* | 4/2018 | Lee | G06K 9/00006 | |
| 9,965,608 B2* | 5/2018 | Jang | G06K 9/00087 | |
| 10,051,567 B2* | 8/2018 | Soundararajan | G06Q 20/20 | |
| 10,055,633 B2* | 8/2018 | Ahn | G06F 3/04883 | |
| 10,417,402 B2* | 9/2019 | Bradley | G06F 21/316 | |
| 10,444,890 B2* | 10/2019 | Kim | G06F 3/0416 | |
| 10,491,740 B2* | 11/2019 | Tanabe | H04M 1/72569 | |
| 2005/0039027 A1* | 2/2005 | Shapiro | G06F 21/32 | 713/186 |
| 2006/0031289 A1* | 2/2006 | Experton | G06F 9/4843 | 709/204 |
| 2006/0248554 A1* | 11/2006 | Priddy | G06K 9/00885 | 725/25 |
| 2006/0288182 A1* | 12/2006 | Chou | G06F 21/32 | 711/163 |
| 2007/0150842 A1* | 6/2007 | Chaudhri | G06F 3/0488 | 715/863 |
| 2007/0195998 A1* | 8/2007 | Le Saint | G06F 21/32 | 382/115 |
| 2007/0239980 A1* | 10/2007 | Funayama | G06F 21/31 | 713/155 |
| 2008/0016371 A1* | 1/2008 | Jiang | G06F 21/32 | 713/186 |
| 2008/0032682 A1* | 2/2008 | Jung | H04W 12/0027 | 455/418 |
| 2009/0091544 A1* | 4/2009 | Lindroos | G06F 3/0416 | 345/173 |
| 2010/0099394 A1* | 4/2010 | Hainzl | G06F 1/32 | 455/418 |
| 2010/0138344 A1* | 6/2010 | Wong | G06Q 20/10 | 705/44 |
| 2010/0225607 A1* | 9/2010 | Kim | G06F 3/042 | 345/173 |
| 2010/0231356 A1* | 9/2010 | Kim | G06F 3/048 | 340/5.83 |
| 2011/0080260 A1* | 4/2011 | Wang | G06F 21/32 | 340/5.83 |
| 2012/0054046 A1* | 3/2012 | Albisu | G06Q 20/20 | 705/16 |
| 2012/0062470 A1* | 3/2012 | Chang | G06F 1/3262 | 345/173 |
| 2012/0071149 A1* | 3/2012 | Bandyopadhyay | G06F 1/1643 | 455/418 |
| 2012/0120013 A1* | 5/2012 | Kurz | G06F 3/0488 | 345/173 |
| 2012/0127179 A1* | 5/2012 | Aspelin | G06F 21/32 | 345/441 |
| 2012/0185398 A1* | 7/2012 | Weis | G06Q 20/20 | 705/75 |
| 2012/0233571 A1* | 9/2012 | Wever | G06F 3/048 | 715/835 |
| 2012/0280917 A1* | 11/2012 | Toksvig | G06F 1/1626 | 345/173 |
| 2013/0015946 A1* | 1/2013 | Lau | G07C 9/00 | 340/5.2 |
| 2013/0031623 A1* | 1/2013 | Sanders | G06F 21/34 | 726/19 |
| 2013/0102273 A1* | 4/2013 | Jung | G06Q 30/0261 | 455/404.2 |
| 2013/0111415 A1* | 5/2013 | Newman | G06F 1/3203 | 715/864 |
| 2013/0129162 A1* | 5/2013 | Cheng | G06F 3/0488 | 382/124 |
| 2013/0298224 A1* | 11/2013 | Heilpern | G06F 21/32 | 726/19 |
| 2013/0298226 A1* | 11/2013 | Fang | H04M 1/67 | 726/20 |
| 2014/0028823 A1* | 1/2014 | Tahk | G06F 21/32 | 348/77 |
| 2014/0056493 A1* | 2/2014 | Gozzini | G06K 9/00087 | 382/124 |
| 2014/0283142 A1* | 9/2014 | Shepherd | G06F 3/0482 | 726/30 |
| 2014/0289683 A1* | 9/2014 | Park | G06F 3/0488 | 715/863 |
| 2014/0292649 A1* | 10/2014 | Bae | G06F 3/017 | 345/156 |
| 2014/0341447 A1* | 11/2014 | Cho | G06K 9/00087 | 382/124 |
| 2014/0359757 A1* | 12/2014 | Sezan | G06F 21/32 | 726/19 |
| 2014/0366158 A1* | 12/2014 | Han | G06F 21/32 | 726/28 |
| 2015/0007355 A1* | 1/2015 | Ferren | H04L 63/107 | 726/35 |
| 2015/0036065 A1* | 2/2015 | Yousefpor | G06K 9/228 | 349/12 |
| 2015/0047017 A1* | 2/2015 | Kim | G06F 21/32 | 726/19 |
| 2015/0049922 A1* | 2/2015 | Miller | H04L 63/083 | 382/118 |
| 2015/0074615 A1* | 3/2015 | Han | G06F 21/31 | 715/863 |
| 2015/0121514 A1* | 4/2015 | Park | G06F 21/34 | 726/19 |
| 2015/0135108 A1* | 5/2015 | Pope | A63F 13/537 | 715/767 |
| 2015/0199554 A1* | 7/2015 | Merrell | G06K 9/00033 | 382/124 |
| 2015/0248209 A1* | 9/2015 | Kim | G06F 3/0488 | 345/173 |
| 2015/0269409 A1* | 9/2015 | Weber | G06F 3/044 | 382/125 |
| 2015/0277652 A1* | 10/2015 | Kim | G06Q 20/40 | 345/173 |
| 2015/0324569 A1* | 11/2015 | Hong | G06F 21/32 | 345/174 |
| 2015/0324625 A1* | 11/2015 | Mo | G06F 21/32 | 382/124 |
| 2015/0347811 A1* | 12/2015 | Kim | G06K 9/00033 | 382/124 |

(56) References Cited

U.S. PATENT DOCUMENTS

| | | | | |
|---|---|---|---|---|
| 2015/0350202 A1* | 12/2015 | Wei | ............... | G06F 21/32 |
| | | | | 726/18 |
| 2015/0378595 A1* | 12/2015 | Jung | ............... | G06Q 30/0267 |
| | | | | 715/835 |
| 2016/0018984 A1* | 1/2016 | Choi | ............... | G06F 21/629 |
| | | | | 715/716 |
| 2016/0019859 A1* | 1/2016 | Choi | ............... | G06T 1/60 |
| | | | | 345/520 |
| 2016/0042166 A1* | 2/2016 | Kang | ............... | G06F 21/32 |
| | | | | 726/7 |
| 2016/0042602 A1* | 2/2016 | Phan | ............... | G07F 17/3237 |
| | | | | 463/29 |
| 2016/0063230 A1* | 3/2016 | Alten | ............... | G06F 21/32 |
| 2016/0188023 A1* | 6/2016 | Chang | ............... | G06K 9/00013 |
| | | | | 345/173 |
| 2016/0232342 A1* | 8/2016 | Ganguly | ............... | G06F 21/36 |
| 2016/0253651 A1* | 9/2016 | Park | ............... | G07F 9/023 |
| | | | | 705/39 |
| 2016/0335471 A1* | 11/2016 | Alameh | ............... | G06K 9/00013 |
| 2017/0004484 A1* | 1/2017 | Seol | ............... | G06F 3/0482 |
| 2017/0053149 A1* | 2/2017 | Jiang | ............... | G06K 9/00087 |
| 2017/0109727 A1* | 4/2017 | Han | ............... | H04W 4/60 |
| 2017/0132449 A1* | 5/2017 | Jiang | ............... | G06F 3/0416 |
| 2017/0147865 A1* | 5/2017 | Jensen | ............... | G06K 9/00053 |
| 2017/0300700 A1* | 10/2017 | Li | ............... | G06F 3/04883 |
| 2017/0308260 A1* | 10/2017 | Li | ............... | G06F 3/0481 |
| 2018/0007192 A1* | 1/2018 | Tanabe | ............... | H04M 1/72569 |
| 2018/0157395 A1* | 6/2018 | Mhun | ............... | G06F 21/36 |
| 2018/0330146 A1* | 11/2018 | Wang | ............... | G06F 9/4418 |

FOREIGN PATENT DOCUMENTS

| | | | | |
|---|---|---|---|---|
| CN | 102627187 | | 8/2012 | |
| CN | 102627187 A * | | 8/2012 | |
| CN | 103064515 | | 4/2013 | |
| CN | 103064515 A * | | 4/2013 | |
| CN | 103678981 | | 3/2014 | |
| CN | 103678981 A * | | 3/2014 | |
| CN | 104052866 A * | | 9/2014 | ............ H04W 12/08 |
| CN | 104063699 | | 9/2014 | |
| CN | 104063699 A * | | 9/2014 | |
| CN | 104408357 | | 3/2015 | |
| CN | 104408357 A * | | 3/2015 | |
| CN | 104461307 | | 3/2015 | |
| CN | 104461307 A * | | 3/2015 | |
| CN | 104598134 | | 5/2015 | |
| CN | 104598134 A * | | 5/2015 | |
| CN | 105023009 | | 11/2015 | |
| CN | 105023009 A * | | 11/2015 | |
| CN | 105094874 | | 11/2015 | |
| CN | 105094874 A * | | 11/2015 | |
| CN | 107038366 A * | | 8/2017 | |
| EP | 2192519 | | 6/2010 | |
| EP | 2192519 A1 * | | 6/2010 | ............ G06F 21/32 |
| EP | 2685704 A1 * | | 1/2014 | ......... G06K 9/00228 |
| EP | 2782376 A1 * | | 9/2014 | ............ H04W 12/06 |
| TW | 201504841 | | 2/2015 | |
| TW | 201504841 A * | | 2/2015 | |
| TW | 201525753 | | 7/2015 | |
| TW | 201525753 A * | | 7/2015 | ......... G06K 9/00006 |

OTHER PUBLICATIONS

Application of contextual QR codes—technologies, Francisco Gutierrez et al.,IEEE, 978-1-4673-6155-2, 2013, pp. 264-269 (Year: 2013).* bbs.meizu.cn [online], "After the firmware is refreshed, the fingerprint unlock will always open the Alipay payment barcode interface by default," Nov. 2015, retrieved on Jul. 23, 2019, retrieved from URL <https://bbs.meizu.cn/thread-9281254-1-1.html>, 6 pages (machine translation).

Crosby et al., "BlockChain Technology: Beyond Bitcoin," Sutardja Center for Entrepreneurship & Technology Technical Report, Oct. 16, 2015, 35 pages.

European Extended Search Report in European Application No. 16883464.6, dated Oct. 23, 2018, 8 pages.

International Search Report issued by the International Searching Authority in International Application No. PCT/CN2016/113443 dated Mar. 30, 2017; 9 pages.

Nakamoto, "Bitcoin: A Peer-to-Peer Electronic Cash System," www.bitcoin.org, 2005, 9 pages.

PCT International Preliminary Report on Patentability in International Application No. PCT/CN2016/113443, dated Jul. 10, 2018, 8 pages (with English translation).

Gutierrez et al., "Application of Contextual QR Codes to Augmented Reality Technologies," IEEE 23rd International Conference on Electronics, Communications and Computing, Mar. 2013, pp. 264-269.

* cited by examiner

INFORMATION IMAGE DISPLAY METHOD AND APPARATUS

This application is a continuation of application Ser. No. 16/028,174, filed on Jul. 5, 2018, which is a continuation of PCT Application No. PCT/CN2016/113443, filed on Dec. 30, 2016, which claims priority to Chinese Patent Application No. 201610009271.2, filed on Jan. 6, 2016, and each application is hereby incorporated by reference in its entirety.

TECHNICAL FIELD

The present disclosure relates to the field of information processing technologies, and in particular, to an information image display method and apparatus.

BACKGROUND

With the development of the intelligent device technologies, a user's devices such as a mobile phone and a watch, can support many short-distance information exchange methods. Many application scenarios emerge accordingly, such as mobile payment, access control, and business card exchange.

Currently, when the user uses an intelligent device such as the mobile phone for two-dimensional (2D) code fast payment, a typical operation process can include taking out, waking up, unlocking the mobile phone, finding, running payment function APP, finding a 2D code functional subpage, and performing a 2D code display operation. It can be seen that, in practical application, performing a complete 2D code display operation takes several steps. The steps are inconvenient for a user to operate, and cannot adapt well to high user density scenarios, such as in supermarket or on public transportation.

SUMMARY

To resolve the earlier-described technical problem, the present disclosure provides information image display methods and apparatuses. The technical solutions are as follows:

According to a first aspect of the present disclosure, an information image display method is provided, where the method is applied to user equipment having a fingerprint module, and includes: obtaining a fingerprint information detection result detected by the fingerprint module; and in a state of detecting the fingerprint information, invoking an information image display functional interface in an application (APP) where the information image is located, so as to display the information image on a user equipment screen.

According to a second aspect of the present disclosure, an information image display apparatus is provided, where the apparatus is applied to user equipment having a fingerprint module, and includes: a detection control module, configured to obtain a fingerprint information detection result detected by the fingerprint module; and a display control module, configured to: in a state of detecting the fingerprint information, invoke an information image display functional interface in an APP where the information image is located, so as to display the information image on a user equipment screen.

According to a third aspect of the present disclosure, a barcode payment method is provided, where the method is applied to user equipment having a fingerprint module, and includes: obtaining a fingerprint information detection result detected by the fingerprint module; and in a state of detecting the fingerprint information, invoking a payment barcode display interface in a payment APP, so as to display a payment barcode image on a user equipment screen.

According to a fourth aspect of the present disclosure, a barcode payment apparatus is provided, where the apparatus is applied to user equipment having a fingerprint module, and includes: a detection control module, configured to obtain a fingerprint information detection result detected by the fingerprint module; and a payment barcode display control module, configured to: in a state of detecting the fingerprint information, invoke a payment barcode display interface in a payment APP, so as to display a payment barcode image on a user equipment screen.

According to the technical solutions provided in the present disclosure, the fingerprint information is used as a trigger condition for displaying the information image. After the fingerprint information is detected, the information image display functional interface in the information image APP can be automatically invoked by invoking the fingerprint module in the user equipment, so as to display the information image by avoiding complex operation steps such as wakening the device and unlocking the device, and fast displaying the information image.

It should be understood that the previous general description and the following detailed description are merely an example for explanation, and do not limit the present disclosure.

BRIEF DESCRIPTION OF DRAWINGS

To describe the technical solutions in the implementations of the present disclosure or in the existing technology more clearly, the following briefly introduces the accompanying drawings needed for describing the implementations or the existing technology. Apparently, the accompanying drawings in the following description merely show some implementations recorded in the present disclosure, and a person of ordinary skill in the art can still derive other drawings from these accompanying drawings without creative efforts.

DESCRIPTION OF IMPLEMENTATIONS

To make a person skilled in the art better understand the technical solutions in the present disclosure, the following describes the technical solutions in the implementations of the present disclosure in detail with reference to the accompanying drawings in the implementations of the present disclosure. Apparently, the described implementations are merely part of the implementations of the present disclosure. All other implementations obtained by a person of ordinary skill in the art based on the implementations of the present disclosure shall fall within the protection scope of the present disclosure.

An information image display solution provided in the present disclosure can be applied to user equipment having a fingerprint module. The fingerprint module here may be a general term of modules that include a series of functions such as fingerprint collection, matching operation, and authentication or recognition decision. Certainly, to display an information image, the user equipment can further have a basic display function. The user equipment can be a compound device such as a mobile phone, a tablet computer, a smartwatch; or can be a single-function device such as an electronic business card or an electronic label. The user equipment is not limited in the present disclosure. In the present disclosure, the information image can be a functional interface such as a web page in an application (APP), or can be a human-computer interaction interface such as a payment interface. The information image can be a 2D code (or referred to as a 2D barcode), a one-dimensional barcode, or a variable barcode. The application scenarios can be payment, access control, business card exchange, etc. The application scenarios do not affect implementation of the present disclosure.

Figure 1:
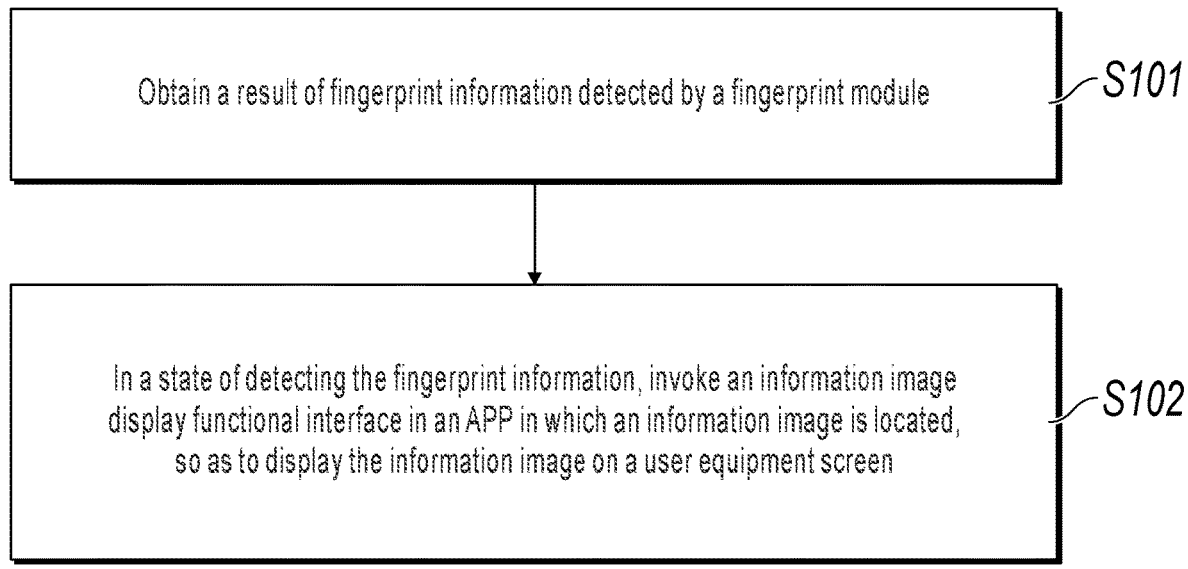
FIG. 1 is a first schematic flowchart illustrating an information image display method according to the present disclosure.

FIG. 1 shows a flowchart illustrating an information image display method according to the present disclosure. The method can be performed by a mobile terminal device such as a mobile phone and can include the following steps.

S101. Obtain a fingerprint information detection result detected by a fingerprint module.

S102. In a state of detecting the fingerprint information, invoke an information image display functional interface in an APP where the information image is located, so as to display the information image on a user equipment screen.

In the present disclosure, the fingerprint information can be used to fast trigger a specific functional interface in a specific APP, so as to fast invoke the specific functional interface in the specific APP, for example, invoke a "payment code" functional page in a digital wallet APP, or a "my business card" functional page in a business card APP. As such, when the mobile phone is powered on, the fingerprint information detection result detected by the fingerprint module can be obtained. If the fingerprint information can be detected, the specific functional page in the earlier-described specific APP is directly displayed, and a related information image is displayed, so that an operation of displaying the information image is simplified.

In the present disclosure, after detecting the fingerprint information, the device can directly invoke a specific functional interface in a specific APP instead of directly invoking the APP. It can reduce the number of steps used for opening the specific functional interface by a user, and improve operation efficiency.

In the present disclosure, when the specific functional interface displays an information image, a static information image generated in advance can be obtained, or an information image can be generated in real time. For example, in a fast display scenario of a payment barcode interface in a payment APP, when the payment barcode interface is displayed, an information image of a payment barcode can be a static image or a dynamically changeable image generated in real time. In practical application, the specific APP can be started in advance and run in the system background, so as to fast invoke the APP when the information image needs to be displayed. Alternatively, the specific APP may not be started in advance. In such case, after detecting the fingerprint information, the device can start the specific APP and run the APP in the system foreground or the system background, so as to fast display the information image and reduce occupied memory resources.

In practical application, after detecting the fingerprint information, the device can first check whether a corresponding APP has run in the system background. If yes, the device directly switches to the APP, and jumps to a specific functional interface that is used for displaying an information image. Otherwise, the device starts the APP, and runs the APP in the system foreground or the system background, and jumps to a specific functional interface that is used for displaying an information image.

In practical application, an association between the fingerprint information and the operation of "invoking the specific functional interface" can be established in advance, so as to directly jump to the specific functional interface instead of a home screen after the fingerprint information is detected. A related setting can be performed in a system of the mobile terminal, so as to establish an association between the fingerprint information and the invoked specific functional interface. When the fingerprint information is detected, the specific functional interface is fast invoked. Alternatively, whether fast invoking of a specific functional interface in an APP installed in the system is supported can be set in the APP, and if the setting is yes, the fingerprint information is associated with the specific functional interface. For example, in a mobile terminal payment APP's setting interface, a user can set the feature of fast invoking a 2D payment code with fingerprint, and can set the specific fingerprint. Alternatively, default setting in the system can be used, and the user can associate a fingerprint to the default setting. In the present disclosure, the specific APP and the specific functional interface can be predetermined by the user or set by the system, etc. A specific fingerprint can be set by the user.

In an implementation, when the fingerprint module detects the fingerprint information, an authentication processing function of the fingerprint module can be used with a user authentication mechanism to improve security of using the information image. To be specific, after the fingerprint information is detected, whether the fingerprint information matches the predetermined fingerprint is determined. If the fingerprint information matches the predetermined fingerprint, the information image can be fast displayed. In the association between the fingerprint information and the operation of invoking the specific functional interface, specific fingerprint information can be set as a trigger condition for fast invoking the specific functional interface. The device user needs to record one or more pieces of fingerprint information of the user in advance, and the fingerprint module generates and stores fingerprint authentication information. In practical application, after detecting fingerprint information, the fingerprint module of the user equipment further determines whether the detected fingerprint information matches the pre-stored fingerprint authentication information. The information image can be displayed only when the fingerprint information matches the pre-stored fingerprint authentication information. When the fingerprint information does not match the pre-stored fingerprint authentication information (or the fingerprint information is not detected), the user equipment screen does not display the information image. Such a trigger mechanism can effectively confirm that a current operator of the user equipment is an authorized user, so as to avoid loss caused by an unauthorized user operating the user equipment. A specific fingerprint collection and authentication algorithm is not limited in the present disclosure. A conventional fingerprint collection and authentication algorithm can be used.

An example of using a mobile phone barcode (including a one-dimensional barcode, a 2D barcode, and the like) for fast payment is provided below to describe the present disclosure in detail. More specifically, in a payment application, a payment barcode interface can be fast invoked based on the present disclosure.

In an implementation, a detection function of the fingerprint module can be continuously enabled. The fingerprint module can detect fingerprint information of the user in real time, and reports the fingerprint information intermittently. To be specific, the user equipment can intermittently obtain the fingerprint information detected by the fingerprint module, so that the user equipment obtains the fingerprint information and then performs corresponding processing. As such, the mobile phone screen can fast display a payment barcode whenever the user inputs fingerprint information, so that the user can fast trigger a barcode to be displayed at any time using a fingerprint. In other words, the mobile phone can detect the fingerprint information in real time using the fingerprint module, and fast start a related specific functional interface at any time by collecting fingerprint information.

In an implementation, the result of the fingerprint information detected by the fingerprint module can be obtained when the user equipment is in an unused mode. The unused mode can be one or more of a locked mode, a sleep mode, and a standby mode. As such, the mobile phone can collect fingerprint information in some specific modes and can fast open a specific functional interface in a related APP.

Among the earlier-described unused modes, the locked mode can represent a limitation on permission for the user to operate the device; the sleep mode and the standby mode can describe a working status of a software or hardware module of the device. The sleep mode and the standby mode are not expressly classified in definition. In some cases, the earlier-described unused modes can simultaneously exist in one device. For example, some devices can be automatically locked after a period of standby or sleep time, or automatically switch a specific software/hardware module to a standby mode or a sleep mode after being locked for a period of time. In conclusion, a common feature of the earlier-described modes is that, if the device is currently in one of these modes, a conventional operation of displaying the barcode by the user is complex. Using the present disclosure enables the user to skip the operation steps such as wakening the device and unlocking the device, and directly display the barcode. In addition, it can reduce enabling time for a function of obtaining a fingerprint detection result, so as to reduce power consumption of the device.

In an implementation, it can be further set that the fingerprint module detects the fingerprint information only in the unused mode, so as to avoid power consumption caused by the fingerprint module. For example, when the mobile phone is in a locked and screen-off state, a detection function of the fingerprint module can be disabled. After the mobile phone is wakened, the fingerprint module can start to detect a fingerprint.

In an implementation, based on an operation sequence of "first wakening and then unlocking" an intelligent device, a time point for obtaining a detection result from the fingerprint module can be set in a time period "after the user equipment is wakened from the sleep mode but is still locked". It reduces the enabling time for a function of obtaining a fingerprint detection result, so as to reduce power consumption of the device.

In an implementation, it can be further set that the fingerprint module detects the fingerprint information only "after the user equipment is wakened from the sleep mode but is still locked", so as to further reduce power consumption caused by the fingerprint module.

In other words, in most time when the mobile phone is not used (for example, when the mobile phone is put in a pocket or a bag), the function of obtaining a fingerprint detection result or the detection function of the fingerprint module can be disabled. After the device is wakened up by other methods (for example, a power key or a volume key), the mobile phone starts a corresponding function, which may include the following cases depending on a fingerprint detection result:

(1) The user inputs fingerprint information to fast display a payment barcode interface.

(2) The user properly unlocks the mobile phone (using a password, a gesture, etc.). After successfully unlocked, the mobile phone enters a used mode, and disables the detection function of the fingerprint module.

(3) The user inputs no information, and the mobile phone may be wakened due to a misoperation. After a period of time, the mobile phone enters the sleep mode again, and disables the detection function of the fingerprint module.

It can be seen that using the present disclosure can further reduce enabling time for the fingerprint module after the user's basic operation habits are adapted to, so as to reduce power consumption of the device.

In the present disclosure, a working mode of the fingerprint module is not limited. For example, the fingerprint module can always detect a fingerprint after the user equipment is powered on, or during a predetermined time period, or reports a fingerprint intermittently, or a processor in the mobile phone actively invokes the fingerprint module for working. A specific working mode of the fingerprint module can be controlled or set based on a specific need.

In an implementation, after the information image is displayed, if no other operation of the user on the device is detected in a period of time, the device stops displaying the information image, so as to prevent the information image from being secretly photographed or stolen, and improve information use security. A duration threshold for stopping displaying the information image can be set based on a practical requirement, for example, 30 seconds or 60 seconds. A specific implementation of stopping displaying the information image can include exiting a specific information image display functional interface, exiting a specific APP, returning to a system standby screen, restoring the device to the locked mode, the sleep mode, etc. This is not limited in the present disclosure.

Figure 2:
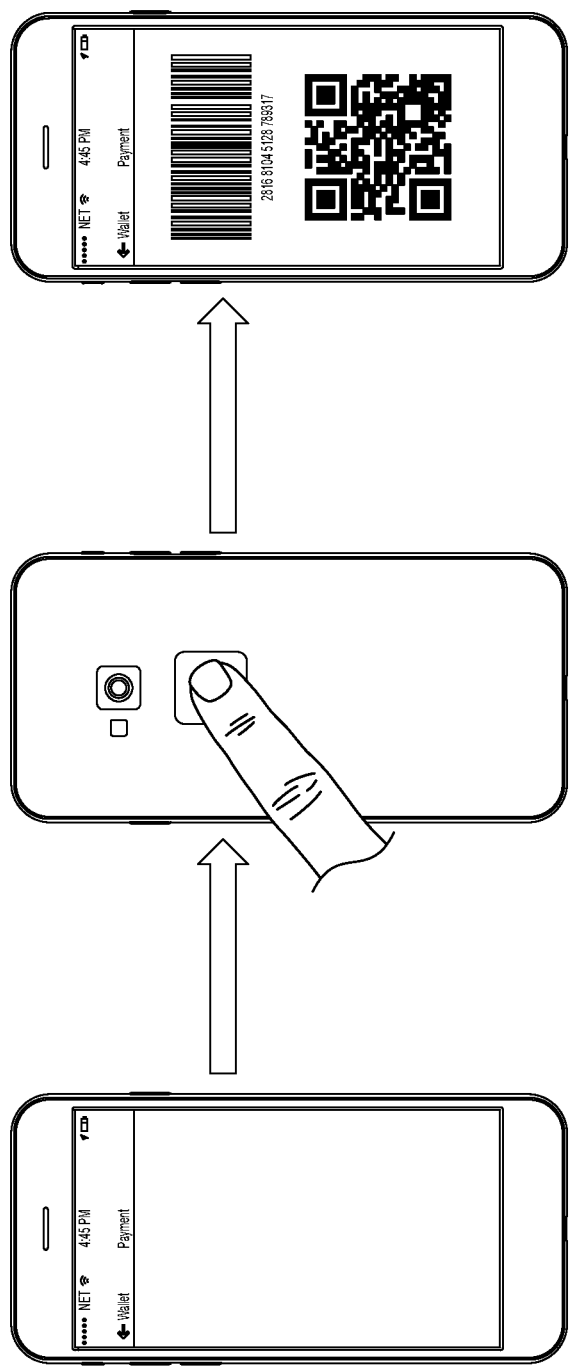
FIG. 2 is a schematic diagram of a specific application scenario of a solution according to the present disclosure.

FIG. 2 shows a schematic diagram of a specific implementation scenario of applying the present disclosure to merchant payment. When the mobile phone is in a sleep mode and locked mode, and the user places a finger on a fingerprint collector on the back of the mobile phone, a fingerprint module collects fingerprint information and performs authentication on the fingerprint information. After the authentication succeeds, a payment barcode (including a one-dimensional barcode and a 2D barcode) image in a payment APP is triggered to be displayed on the mobile phone screen. If the user performs no other operation on the mobile phone in 60 seconds, the payment barcode image displayed on the mobile phone screen disappears.

In an implementation, the device can be further unlocked using fingerprint information. In such case, a function of "unlocking the device using a fingerprint" and a function of "fast displaying an information image using a fingerprint" can be separately used.

Figure 3:
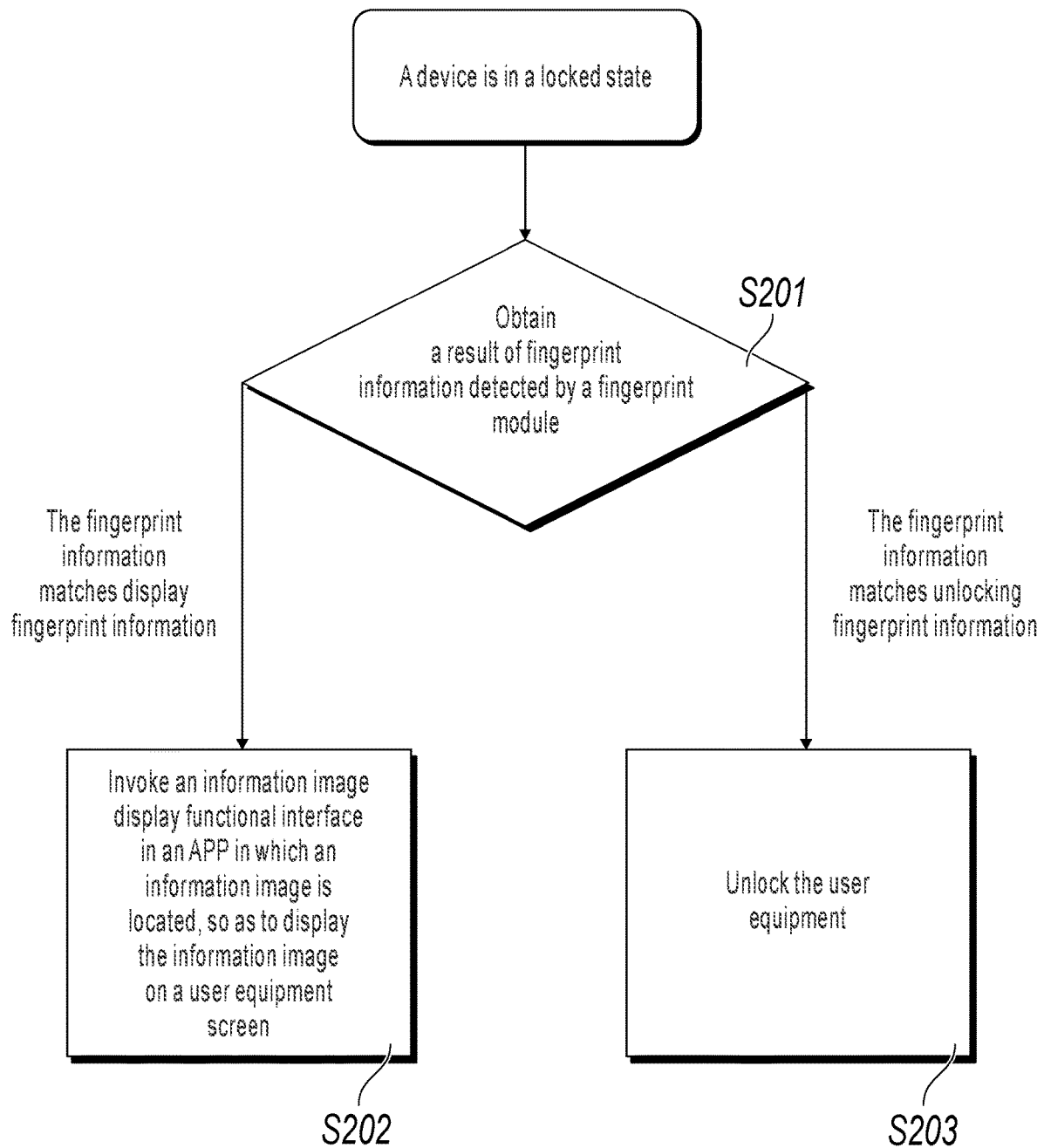
FIG. 3 is a second schematic flowchart illustrating an information image display method according to the present disclosure.

The user can respectively input fingerprint authentication information in advance for displaying an information image ("display fingerprint") and fingerprint authentication information for unlocking the user equipment ("unlocking fingerprint"), and respectively establish an association between the "display fingerprint" and an operation of "invoking an information image display interface in a specific APP", and an association between the "unlocking fingerprint" and operation of "unlocking the user equipment". Further, as shown in FIG. 3, when the user equipment is in a locked mode, after detecting the user-input fingerprint information, the fingerprint module performs different processing based on a matching result between the currently detected fingerprint information and the prestored fingerprint information.

S201. When the user equipment is in a locked mode, obtain a fingerprint information detection result detected by the fingerprint module.

When the fingerprint information is not detected, no operations are performed. Alternatively, when the fingerprint information is detected, if the detected fingerprint information matches the "display fingerprint", performs S202: Invoke an information image display functional interface in an information image APP to display an information image on a user equipment screen.

If the detected fingerprint information matches the "unlocking fingerprint", perform S203: Unlock the user equipment.

A mobile phone payment barcode is still used as an example. Based on use habits, the user can input a fingerprint of the right index finger as the "unlocking fingerprint", and input a fingerprint of the right middle finger as the "display fingerprint". In practical application, after the user takes out and wakens the mobile phone, an unlocking prompt is displayed on the mobile phone screen. In such case, if the user needs to fast display a payment barcode, the user places the middle finger on the fingerprint collector. After a matching success, an APP is invoked and the payment barcode is displayed. If the user needs to use another function of the mobile phone, the user places the index finger on the fingerprint collector. After a matching success, the mobile phone is unlocked in a default mode. As such, two operations of "fast displaying" and "unlocking using a fingerprint" can be effectively distinguished, without interfering the user's normal use habits.

In an implementation, the same finger can be used to perform the functions of unlocking the user equipment and fast displaying an information image. More specifically, the same fingerprint information can be used as both a fingerprint for unlocking the user equipment and a fingerprint for fast displaying an information image. In addition, a time length for collecting a fingerprint can be set to distinguish whether the collected fingerprint is used for unlocking the user equipment or fast displaying a specific information image. For example, the fingerprint module collects the user's fingerprint information, and records a time period when the user's fingerprint stays on a fingerprint sensor. If the time period is within 1 s, the fingerprint is considered as the fingerprint for unlocking the user equipment, and the device is unlocked; or if the time period exceeds 1 s, the fingerprint is considered as the fingerprint for fast displaying a specific information image (for example, a payment barcode page in the payment APP), an information image display functional interface is fast invoked. Certainly, there may be different implementations in other scenarios. For example, to unlock the user equipment or fast display an information image using one fingerprint, the fingerprint sensor can be integrated with a pressure sensor, and pressure obtained during fingerprint collection is detected, so as to determine whether to unlock the user equipment or fast display an information image.

Certainly, in some implementations, a specific information image in a specific APP can be invoked by detecting fingerprint information and using another method. For example, the user can pre-specify one or more keys as a password to trigger the display of an information image. The key can be a physical key or a touch-based virtual key on the mobile phone, or a virtual key on a touchscreen operating system interface, or a specific application interface. When the user needs to fast display an information image, the user further needs to press the customized key while inputting fingerprint information. The device needs not only to obtain a fingerprint information detection result detected by the fingerprint module but also to determine whether a predefined key is pressed. A later information image display operation is triggered only when both "the fingerprint information is detected" and "the predefined key is pressed" are performed.

A mobile phone payment barcode is still used as an example. Based on use habits, the user can specify a "volume decrease" key as the predefined key. In practical application, the user takes out the mobile phone, places a finger (for example, a right index finger) on the fingerprint collector, and presses and holds the "volume decrease" key with another finger (for example, the right thumb) at the same time. The mobile phone detects that the earlier-described two conditions are both met, and then invokes an APP to display a payment barcode.

In some implementations, the fingerprint information can be further used to trigger an information image to be fast displayed, and the detected fingerprint information does not need to be actually authenticated. In other words, any fingerprint information can trigger the information image to be fast displayed. For example, when a specific functional interface in a specific APP is displayed using the earlier-described predefined key, because the predefined key is the user's private information (predefined by the user), a payment barcode can be started without comparing currently detected fingerprint information with fingerprint authentication information, so as to ensure security of using a payment 2D code. In addition, a fingerprint matching unlocking mechanism may not be affected. In some other scenarios, the specific functional interface in the specific APP can be invoked after the fingerprint information is detected, without matching and authenticating the fingerprint information. For example, when the mobile phone is in a working mode, if the mobile phone detects fingerprint information, to be specific, when the user places a fingerprint on the fingerprint sensor, a payment barcode display interface in a payment APP can be invoked.

Figure 4:
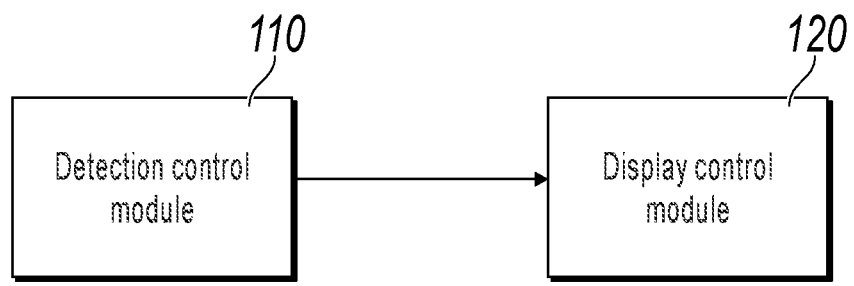
FIG. 4 is a first schematic structural diagram of an information image display apparatus according to the present disclosure.

Corresponding to the earlier-described method implementation, the present disclosure further provides an information image display apparatus. As shown in FIG. 4, the apparatus can include: a detection control module 110, configured to obtain a fingerprint information detection result detected by a fingerprint module; and a display control module 120, configured to: in a state of detecting the fingerprint information, invoke an information image display functional interface in an APP where the information image is located, so as to display the information image on a user equipment screen.

In a specific implementation of the present disclosure, the detection control module 110 can be configured to: obtain the result of the fingerprint information detected by the fingerprint module when the user equipment is in an unused mode, where the unused mode can include a locked mode, a sleep mode, and/or a standby mode.

In a specific implementation of the present disclosure, the detection control module 110 can be configured to: obtain the result of the fingerprint information detected by the fingerprint module, after the user equipment is wakened from the sleep mode but is still in a locked mode.

In a specific implementation of the present disclosure, the detection control module 110 can be further configured to: after the fingerprint information is detected, further determine whether the detected fingerprint information matches pre-stored fingerprint authentication information that is used for displaying the information image. Correspondingly, the "state of detecting the fingerprint information" used by the display control module 120 is a state in which the fingerprint information is detected, and a determining result is that the fingerprint information matches the pre-stored fingerprint authentication information.

Figure 5:
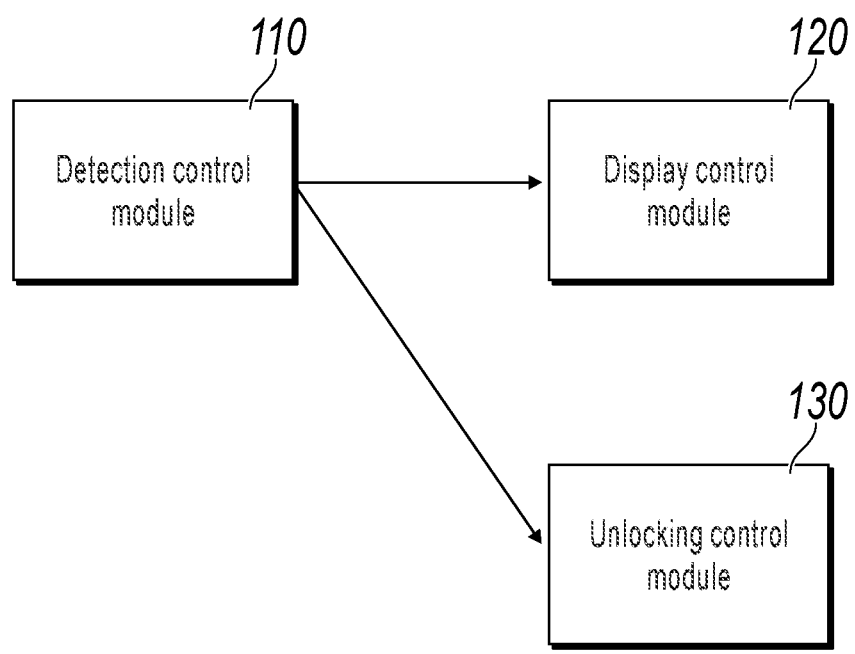
FIG. 5 is a second schematic structural diagram of an information image display apparatus according to the present disclosure.

In a specific implementation of the present disclosure, the fingerprint authentication information for displaying the information image is different from fingerprint authentication information for unlocking the user equipment. Correspondingly, as shown in FIG. 5, the information image display apparatus provided in the present disclosure can further include an unlocking control module 130, configured to: when the user equipment is in a locked mode, detect the fingerprint information; and after it is determined that the detected fingerprint information matches pre-stored fingerprint authentication information that is used for unlocking the user equipment, unlock the user equipment.

In a specific implementation of the present disclosure, the detection control module 110 can be further configured to: when the user equipment is in an unused mode, determine whether a predefined key is pressed. Correspondingly, the "state of detecting the fingerprint information" used by the display control module 120 is a state in which the fingerprint information is detected, and the predefined key is pressed.

Figure 6:
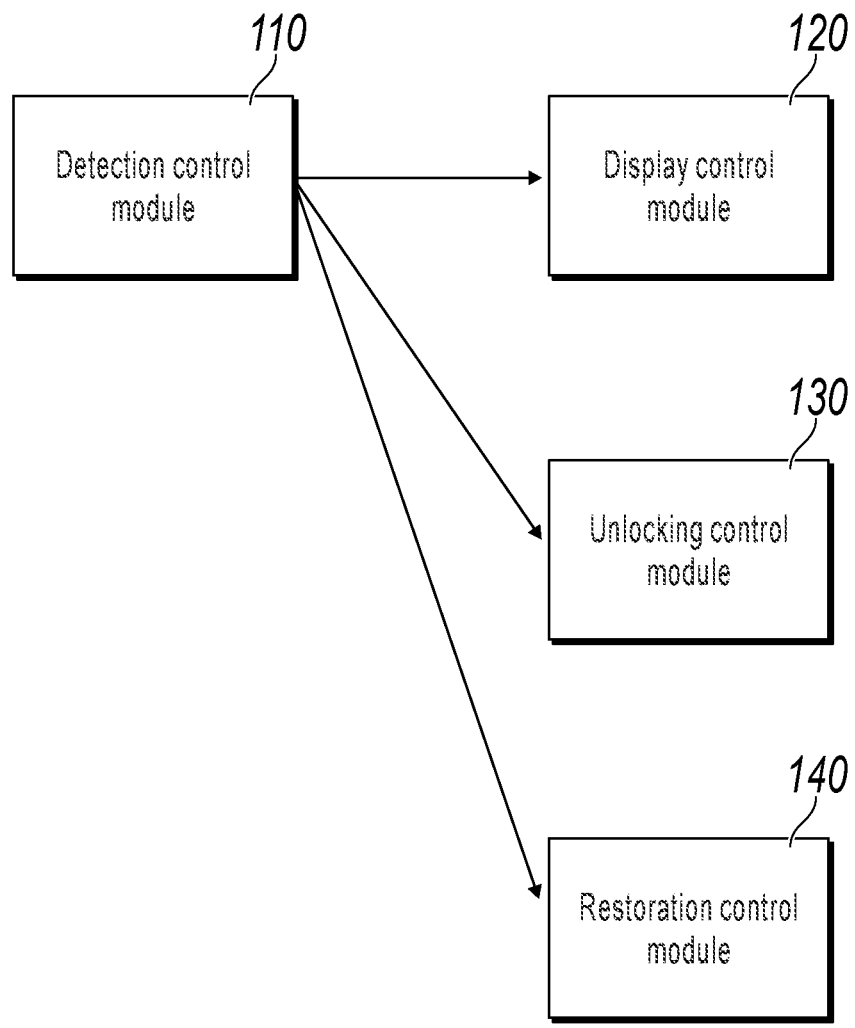
FIG. 6 is a third schematic structural diagram of an information image display apparatus according to the present disclosure.

As shown in FIG. 6, in a specific implementation of the present disclosure, the information image display apparatus can further include: a restoration control module 140, configured to: after the information image is displayed, if display duration exceeds a predetermined duration threshold, stop displaying the information image.

It can be understood that the unlocking control module 130 and the restoration control module 140 are two modules with independent functions, and can be both configured in the apparatus shown in FIG. 6, or be separately configured in the apparatus. Therefore, the structure shown in FIG. 6 should not be considered as a limitation on the present disclosure.

The present disclosure further provides a barcode payment apparatus, where the apparatus is applied to user equipment having a fingerprint module, and includes: a detection control module, configured to obtain a fingerprint information detection result detected by the fingerprint module; and a payment barcode display control module, configured to: in a state of detecting the fingerprint information, invoke a payment barcode display interface in a payment APP, so as to display a payment barcode image on a user equipment screen.

The barcode payment apparatus can be an implementation of the image display apparatus in a specific application environment. Therefore, for a specific implementation principle and structure illustration of the barcode payment apparatus, refer to descriptions in the implementation of the information image display apparatus and descriptions in FIG. 4 to FIG. 6. Details are not repeatedly described in this implementation again.

In addition, for a specific implementation process of functions and purposes of each module in the apparatus, refer to an implementation process of a corresponding step in the earlier-described method. Details are not described here again.

Figure 7:
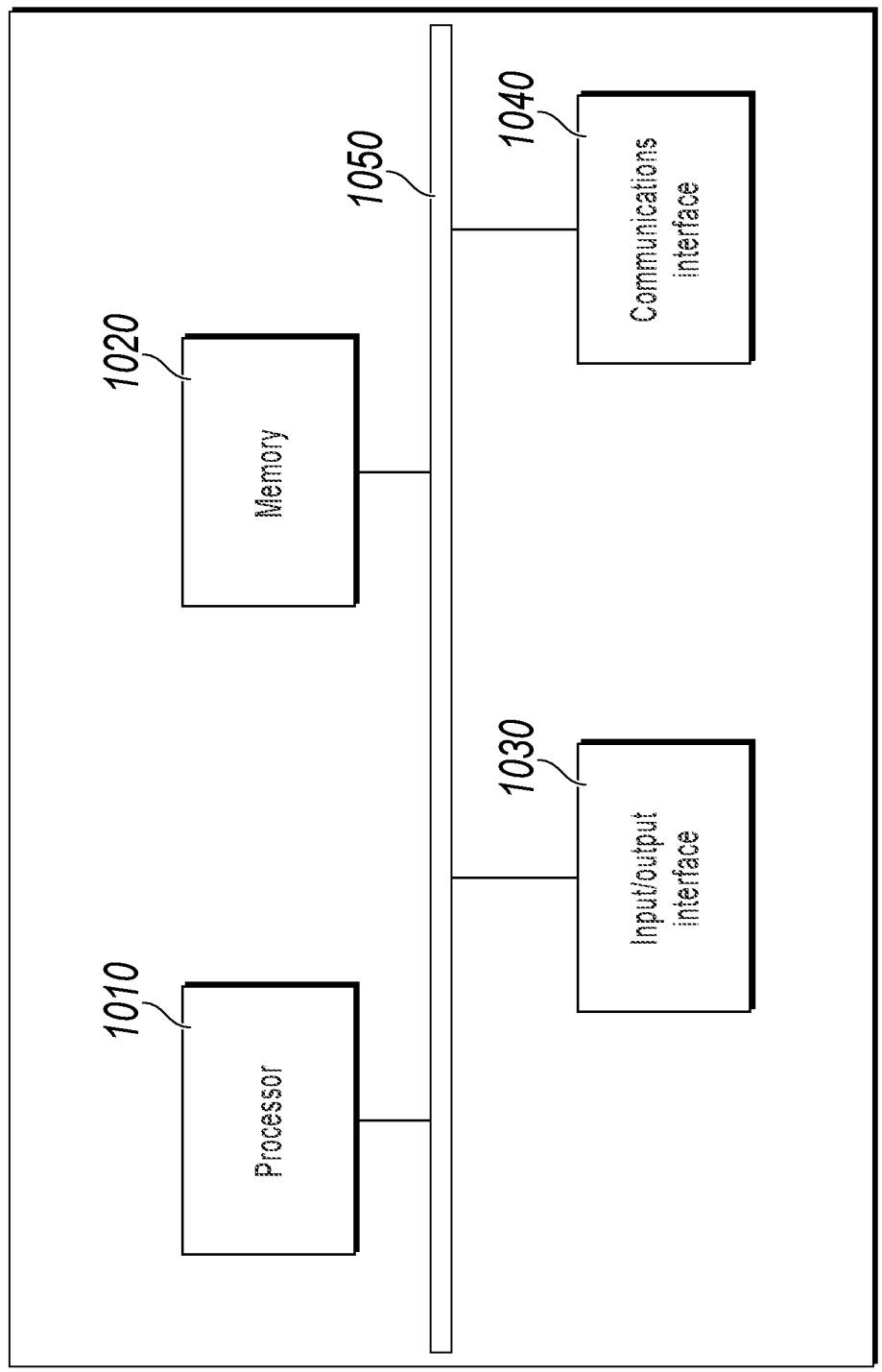
FIG. 7 is a schematic structural diagram of a device for configuring an apparatus according to the present disclosure.

The information image display apparatus or the barcode payment apparatus provided in the present disclosure can be applied to devices such as a mobile phone, a tablet computer, and a smartwatch. FIG. 7 is a schematic diagram of a hardware structure of a device for configuring the earlier-described apparatus, according to the present disclosure. The device can include a processor 1010, a memory 1020, an input/output interface 1030, a communications interface 1040, and a bus 1050. The processor 1010, the memory 1020, the input/output interface 1030, and the communications interface 1040 communicate with each other and are connected to each other inside the device using the bus 1050.

The processor 1010 can be implemented by a general-purpose CPU (Central Processing Unit, central processing unit), a microprocessor, an application-specific integrated circuit (Application-Specific Integrated Circuit, ASIC), or one or more integrated circuits, and is configured to execute a related program, so as to implement the technical solutions provided in the present disclosure.

The memory 1020 can be implemented by a ROM (Read-Only Memory, read-only memory), a RAM (Random Access Memory, random access memory), a static storage device, a dynamic storage device, and the like. The memory 1020 can store an operating system and another application program. When the technical solutions provided in the present disclosure are implemented using software or firmware, a related program code is stored in the memory 1020, and is invoked and executed by the processor 1010.

The input/output interface 1030 is configured to connect to an input/output module, so as to implement information input and output. The input/output module can be configured as a component in the device (not shown in the figure), or can be externally connected to the device to provide a corresponding function. The input device can include a keyboard, a mouse, a touchscreen, a microphone, various sensors, and the like. The output device can include a display, a loudspeaker, a vibrator, an indicator, and the like.

The communications interface 1040 is configured to connect to a communications module (not shown in the figure), so that the device communicates and interacts with another device. The communications module can implement communication in a wired manner (for example, a USB or a network cable) or a wireless manner (for example, a mobile network, WiFi, or Bluetooth).

The bus 1050 includes a channel to transmit information between components (for example, the processor 1010, the memory 1020, the input/output interface 1030, and the communications interface 1040) of the device.

It is worthwhile to note that, although the device shows only the processor 1010, the memory 1020, the input/output interface 1030, the communications interface 1040, and the bus 1050, in a specific implementation process, the device can further include other components needed for normal running. In addition, a person skilled in the art should understand that the earlier-described device can include only a component needed for implementing the present disclosure, and does not need to include all components shown in the figure.

It can be learned from description of the earlier-described implementations that, a person skilled in the art can clearly understand that the present disclosure can be implemented by using software in addition to a necessary universal hardware platform. Based on such an understanding, the technical solutions of the present disclosure essentially or the part contributing to the existing technology can be implemented in a form of a software product. The software product can be stored in a storage medium, such as a ROM/RAM, a magnetic disk, or an optical disc, and include several instructions for instructing a computer device (which can be a personal computer, a server, or a network device) to perform the methods described in the implementations or in some parts of the implementations of the present disclosure.

The implementations in the present disclosure are all described in a progressive method. For same or similar parts in the implementations, refer to these implementations, and each implementation focuses on a difference from other implementations. Especially, an apparatus implementation is basically similar to a method implementation, and therefore is described briefly. For related parts, refer to partial descriptions in the method implementation. The earlier-described apparatus implementations are merely examples. The modules described as separate parts can be or cannot be physically separate. During implementation of the present disclosure, functions of the modules can be implemented in one or more pieces of software and/or hardware. Some or all of the modules can be selected according to an actual need to implement the solutions of the implementations. A person of ordinary skill in the art can understand and implement the implementations of the present disclosure without creative efforts.

The previous descriptions are merely specific implementations of the present disclosure. It should be noted that a person of ordinary skill in the art can make several improvements or polishing without departing from the principle of the present disclosure. The improvements and polishing shall fall within the protection scope of the present disclosure.

Figure 8:
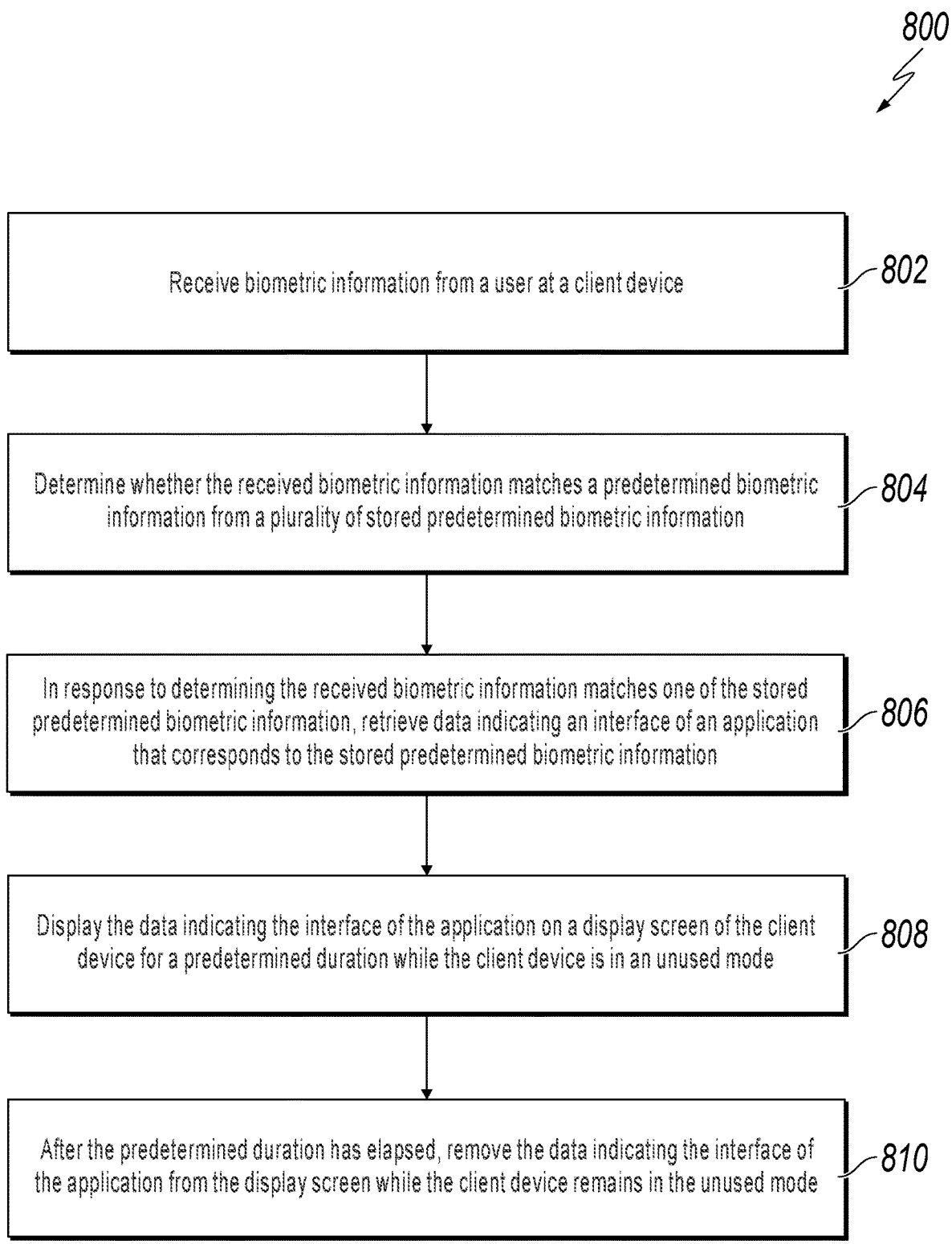
FIG. 8 is a flowchart illustrating an example of a computer-implemented method for, according to an implementation of the present disclosure.

FIG. 8 is a flowchart illustrating an example of a computer-implemented method 800 for displaying an information image. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, the device receives biometric information from a user. In some implementations, the device, such as a mobile device or table, can receive biometric information from the owner of the device. For example, the biometric information can be a fingerprint scan, a voice recognition, a retina scan, or a facial recognition, to name a few examples. The user can be the owner of the client device or another individual related to the owner of the client device. In some implementations, the user can provide the biometric information for a particular length of time. By inputting the biometric information for less than a threshold, the user intends to access a first function of the device. By inputting the biometric information more than a threshold, the user intends to access a second function of the device. For example, when the user provides a pointer finger for a biometric fingerprint scan for 1 second, the user intends to unlock the phone. Alternatively, when the user provides the pointer finger for a biometric fingerprint scan for longer than 1 second, such as 2 seconds, the user intends to invoke an information image display functional interface in an application where the information image is located, so as to display the information image on the display screen of the device.

In some implementations, the user can provide biometric information to the device using various forms of input that corresponds to a request for a different function. For example, when the user provides the pointer finger for a biometric fingerprint scan to the device for 1 second, the user intends to unlock the device. Alternatively, when the user provides the thumb for a biometric fingerprint scan to the device for 1 second, the user intends to invoke an application to display on the display of the device. Thus, different biometric inputs can correspond to requested different functions of the device. In addition, different biometric inputs provided for various lengths of time can correspond to requested different functions of the device. From 802, method 800 proceeds to 804.

At 804, the device determines whether the received biometric information matches a predetermined biometric information from a plurality of stored predetermined biometric information. In particular, the device can store a plurality of predetermined biometric information corresponding to a user or multiple users. The stored plurality of predetermined biometric information can be in the form of a fingerprint scan, a facial recognition, a voice recognition, and a retina scan. In addition, the stored plurality of predetermined biometric information can correspond to different profiles of the user. For example, for a particular user, the device may store a fingerprint scan for each of the user's fingers, different commands of the user, and for both of the user's eyes. The device can compare the received biometric information to each of the stored predetermined biometric information to determine if a match exists. In some implementations, the device can store the plurality of stored predetermined biometric information. In other implementations, a server may store the plurality of stored predetermined biometric information. The device can communicate with the server to retrieve a match from the plurality of stored predetermined biometric information over a network. The network can be a wired or wireless connection. In some implementations, the server can be implemented over one or more computers, in a cloud network, locally or wirelessly.

In some implementations, the device compares the received biometric information to each predetermined biometric information from the plurality of stored predetermined biometric information. In particular, the device can use one or more distance metrics to determine whether the received fingerprint scan from the user, for examples, matches the stored fingerprint scan of the plurality of stored predetermined biometric information. The distance metrics can include results from a comparison between a received fingerprint scan and a stored fingerprint scan, a received retinal scan and a stored retinal scan, a received voice recognition and a stored voice recognition, and a received facial recognition scan and a stored facial recognition scan, for example. When the distance metrics are within a predetermined threshold, the device deems a match is found. From 804, method 800 proceeds to 806.

At 806, in response to the device determining the received biometric information matches one of the stored predetermined biometric information, the device retrieves data indicating an interface of an application that corresponds to the stored predetermined biometric information. In particular, once a match is found, the device retrieves an application corresponding to the matched stored predetermined biometric information. For example, the device can associate a stored fingerprint scan from a user's left finger with a mobile payment application. Thus, when the device determines that the received left fingerprint scan matches a stored fingerprint scan, and the stored fingerprint scan corresponds to the mobile payment application. In other implementations, each stored biometric information in the stored plurality of biometric information corresponds to an application. For example, the application can include a mobile payment application, a photo browsing application, a video viewing application, and an entertainment game application, to name a few examples. The data indicating the interface of the application can include a representation of the application. For example, the data for the mobile payment application can include a barcode. In another example, the photo browsing application can include one or more photos from the photo library of the device. In another example, the video viewing application can include one or more videos to view from the video library of the device. The device can retrieve the data indicating the interface of the application to display on the client device. From 806, method 800 proceeds to 808.

At 808, the device displays the data indicating the interface of the application on a display screen of the device for a predetermined duration while the device is in an unused mode. In particular, the data that can be displayed on the device include can be the representation of the application. For example, the data can be the barcode for the mobile payment application; one or more scrolling photos from the photo library of the device; one or more videos to view from the video library of the device. In some implementations, the device can remain in the unused mode while displaying the data. For example, the unused mode can be a locked mode, a sleep mode, and a stand-by mode. The predetermined duration can be a time configured by the user. For example, the user can set the time to be 5 seconds or 10 seconds. From 808, method 800 proceeds to 810.

At 810, after the predetermined duration has elapsed, the device removes the data indicating the interface of the application from the display screen while the device remains in the unused mode. In particular, the device clears the display screen of the data indicating the interface of the application while the device remains in the unused mode. Thus, the device never needs to be awakened and unlocked in order to access the application. After 810, method 800 stops.

The process described above is intended to speed up the use of applications performed by the client device. In particular, the process includes using biometric information to trigger a condition for displaying an information image. After the biometric information is detected, the information image display functional interface in the information image APP can be automatically invoked by invoking the fingerprint module in the user equipment, so as to display the information image by avoiding complex operation steps such as wakening the device and unlocking the device, and fast displaying the information image. The aforementioned process includes the following benefits: the client device can retrieve the application data with minimal power consumption without awakening or unlocking the client device. Additionally, the user can quickly use the features of the client device without having to go through the process of searching for the application on the client device.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
receiving a user input comprising biometric information and a predefined key activation, wherein the biometric information is provided in a biometric detection state of a client device that is in a locked mode, in which a fingerprint collector of the client device receives a first user input from a first finger of a user and the predefined key activation is provided by activating a predefined key comprising a touch-based virtual key on the client device receiving a second user input from a second finger of the user, wherein simultaneously activating the fingerprint collector and the predefined key is pre-specified as a password to trigger a display of an information image corresponding to a data of an interface of an application;
determining a time period and a pressure for receiving the biometric information;
comparing the time period to a predetermined stored time period and the pressure to an obtained pressure;
in response to determining that the time period is greater than the predetermined stored time period, triggering the display of the data indicating the interface of the application on a display screen of the client device, wherein the predetermined stored time period is 1 second;
determining whether the received biometric information matches a predetermined biometric information from a plurality of stored predetermined biometric information;
in response to determining the received biometric information matches one of the stored predetermined biometric information, retrieving the data indicating the interface of the application that corresponds to the stored predetermined biometric information;
displaying the information image comprising the data indicating the interface of the application on the display screen of the client device for a predetermined duration while the client device is in the locked mode, wherein the information image is a dynamically changing image of a payment barcode generated in real time.

2. The computer-implemented method of claim 1, wherein the locked mode comprises at least one of a sleep mode and a standby mode of the client device.

3. The computer-implemented method of claim 1, wherein displaying the data indicating the interface of the application further comprises displaying the data indicating the interface of the application on the display screen of the client device for the predetermined duration while the client device is in the locked mode without waking the client device and without unlocking the client device.

4. The computer-implemented method of claim 1, further comprising:
displaying the data indicating the interface of the application the display screen of the client device for the predetermined duration while the client device is in an awakened mode and the locked mode.

5. The computer-implemented method of claim 1, further comprising:
receiving an indication of a button press at the client device while receiving the biometric information from the user at the client device; and
in response to receiving the indication of the button press at the client device while receiving the biometric information from the user at the client device, retrieving the data indicating the interface of the application that corresponds to the stored predetermined biometric information for display.

6. A non-transitory, computer-readable medium storing one or more instructions executable by a computer system to perform operations comprising:
receiving a user input comprising biometric information and a predefined key activation, wherein the biometric information is provided in a biometric detection state of a client device that is in a locked mode, in which a fingerprint collector of the client device receives a first user input from a first finger of a user and the predefined key activation is provided by activating a predefined key comprising a touch-based virtual key on the client device receiving a second user input from a second finger of the user, wherein simultaneously activating the fingerprint collector and the predefined key is pre-specified as a password to trigger a display of an information image corresponding to a data of an interface of an application;
determining a time period and a pressure for receiving the biometric information;
comparing the time period to a predetermined stored time period and the pressure to an obtained pressure;
in response to determining that the time period is greater than the predetermined stored time period, triggering the display of the data indicating the interface of the application on a display screen of the client device, wherein the predetermined stored time period is 1 second;
determining whether the received biometric information matches a predetermined biometric information from a plurality of stored predetermined biometric information;
in response to determining the received biometric information matches one of the stored predetermined biometric information, retrieving the data indicating the interface of the application that corresponds to the stored predetermined biometric information;
displaying the information image comprising the data indicating the interface of the application on the display screen of the client device for a predetermined duration while the client device is in the locked mode, wherein the information image is a dynamically changing image of a payment barcode generated in real time.

7. The non-transitory, computer-readable medium of claim 6, wherein the locked mode comprises at least one of a sleep mode and a standby mode of the client device.

8. The non-transitory, computer-readable medium of claim 6, wherein displaying the data indicating the interface of the application further comprises displaying the data indicating the interface of the application on the display screen of the client device for the predetermined duration while the client device is in the locked mode without waking the client device and without unlocking the client device.

9. The non-transitory, computer-readable medium of claim 6, further comprising displaying the data indicating the interface of the application the display screen of the client device for the predetermined duration while the client device is in an awakened mode and the locked mode.

10. The non-transitory, computer-readable medium of claim 6, further comprising:
receiving an indication of a button press at the client device while receiving the biometric information from the user at the client device; and
in response to receiving the indication of the button press at the client device while receiving the biometric information from the user at the client device, retrieving the data indicating the interface of the application that corresponds to the stored predetermined biometric information for display.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving a user input comprising biometric information and a predefined key activation, wherein the biometric information is provided in a biometric detection state of a client device that is in a locked mode, in which a fingerprint collector of the client device receives a first user input from a first finger of a user and the predefined key activation is provided by activating a predefined key comprising a touch-based virtual key on the client device receiving a second user input from a second finger of the user, wherein simultaneously activating the fingerprint collector and the predefined key is pre-specified as a password to trigger a display of an information image corresponding to a data of an interface of an application;
determining a time period and a pressure for receiving the biometric information;
comparing the time period to a predetermined stored time period and the pressure to an obtained pressure;
in response to determining that the time period is greater than the predetermined stored time period, triggering the display of the data indicating the interface of the application on a display screen of the client device, wherein the predetermined stored time period is 1 second;
determining whether the received biometric information matches a predetermined biometric information from a plurality of stored predetermined biometric information;
in response to determining the received biometric information matches one of the stored predetermined biometric information, retrieving the data indicating the interface of the application that corresponds to the stored predetermined biometric information;
displaying the information image comprising the data indicating the interface of the application on the display screen of the client device for a predetermined duration while the client device is in the locked mode, wherein the information image is a dynamically changing image of a payment barcode generated in real time.

12. The computer-implemented system of claim 11, wherein the locked mode comprises at least one of a sleep mode and a standby mode of the client device.

13. The computer-implemented system of claim 11, wherein displaying the data indicating the interface of the application further comprises displaying the data indicating the interface of the application on the display screen of the client device for the predetermined duration while the client device is in the locked mode without waking the client device and without unlocking the client device.

* * * * *

UNITED STATES PATENT AND TRADEMARK OFFICE
CERTIFICATE OF CORRECTION

PATENT NO. : 10,691,920 B2
APPLICATION NO. : 16/719836
DATED : June 23, 2020
INVENTOR(S) : Wang et al.

Page 1 of 1

It is certified that error appears in the above-identified patent and that said Letters Patent is hereby corrected as shown below:

On the Title Page

Item (56), Column 2/Line 1, Under Other publications, delete "referessed" and insert -- refreshed --, therefor.

In the Claims

Column 17/Line 7 (Approx.), In Claim 4, after "application" insert -- on --.

Column 18/Line 8 (Approx.), In Claim 9, after "application" insert -- on --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*